(12) United States Patent  (10) Patent No.: US 9,609,812 B2
Ciudaj  (45) Date of Patent: Apr. 4, 2017

(54) IRRIGATION DEVICE FOR PROMOTING DEEP ROOT GROWTH OF A PLANT

(71) Applicant: DEEP ROOT IRRIGATION, LLC, Angwin, CA (US)

(72) Inventor: Jeffrey Ciudaj, Angwin, CA (US)

(73) Assignee: DEEP ROOT IRRIGATION, LLC, Angwin, CA (US)

( * ) Notice: Subject to any disclaimer, the term of this patent is extended or adjusted under 35 U.S.C. 154(b) by 0 days.

(21) Appl. No.: 15/048,686

(22) Filed: Feb. 19, 2016

(65) Prior Publication Data

US 2016/0165819 A1 Jun. 16, 2016

Related U.S. Application Data

(63) Continuation-in-part of application No. 14/318,480, filed on Jun. 27, 2014, now abandoned.

(51) Int. Cl.
*A01G 29/00* (2006.01)
*A01G 25/06* (2006.01)

(52) U.S. Cl.
CPC ............. *A01G 29/00* (2013.01); *A01G 25/06* (2013.01)

(58) Field of Classification Search
CPC .................................................... A01G 25/06
USPC ................. 138/110, 127, 133, 134
See application file for complete search history.

(56) References Cited

U.S. PATENT DOCUMENTS

| 587,779 A | 8/1897 | Barker |
|---|---|---|
| 1,280,486 A | 3/1917 | Kanst |
| 2,083,153 A | 1/1936 | Irish |
| 2,127,175 A | 8/1938 | Duering et al. |
| 2,790,403 A | 4/1957 | Larsen |
| 3,426,544 A | 2/1969 | Curtis |
| 3,555,170 A * | 1/1971 | Petzetakis ............... B29C 70/22 138/103 |
| 3,587,972 A | 6/1971 | Weeth |
| 3,672,571 A | 6/1972 | Goodricke |
| 3,900,962 A | 8/1975 | Chan |
| 4,162,041 A | 7/1979 | Hane |
| 4,453,343 A | 6/1984 | Grimes et al. |
| 4,789,005 A * | 12/1988 | Griffiths ................ F16L 11/088 138/103 |
| 5,192,027 A * | 3/1993 | Delmer ................. C23C 24/087 239/542 |
| 5,310,281 A | 5/1994 | Elena |
| 5,694,716 A | 12/1997 | Bible |
| 5,761,846 A | 6/1998 | Marz |
| 5,938,372 A | 8/1999 | Lichfield |
| 5,975,797 A | 11/1999 | Thomas et al. |
| 5,996,279 A | 12/1999 | Zayeratabat |
| 6,260,769 B1 | 7/2001 | Hoover |

(Continued)

FOREIGN PATENT DOCUMENTS

| AU | PS08-9202 | 3/2002 |
|---|---|---|
| AU | 2002300497 | 9/2003 |

(Continued)

*Primary Examiner* — John Kreck
(74) *Attorney, Agent, or Firm* — Hankin Patent Law, APC; Marc E. Hankin; Kevin Schraven (57) ABSTRACT

An irrigation device for promoting deep root growth of a plant. The irrigation device may comprise: a tube and a hose. The device may comprise one or more copper elements or a copper coating. The irrigation device may also be adapted to emit an odor and/or comprise one or more measurement marks.

5 Claims, 5 Drawing Sheets

(56) References Cited

U.S. PATENT DOCUMENTS

| | | |
|---|---|---|
| 6,394,368 B1 | 5/2002 | Hintz |
| 6,443,367 B1 | 9/2002 | Bova |
| 6,540,436 B2 | 4/2003 | Ogi |
| 7,225,585 B2 | 6/2007 | Zayeratabat |
| 8,065,832 B2 | 11/2011 | King |
| 8,132,362 B2 | 3/2012 | King |
| 8,381,437 B2 | 2/2013 | Ciudaj |
| 2003/0163956 A1 | 9/2003 | Staples |
| 2003/0196375 A1 | 10/2003 | Ferro |
| 2008/0005960 A1 | 1/2008 | King |
| 2011/0056128 A1 | 3/2011 | King |
| 2011/0219684 A1* | 9/2011 | Ciudaj .................. A01G 29/00 47/48.5 |

FOREIGN PATENT DOCUMENTS

| | | |
|---|---|---|
| AU | 2007260876 | 12/2007 |
| CN | 101472467 | 3/2002 |
| WO | 2007150050 A2 | 12/2007 |
| WO | 2007150050 A3 | 8/2008 |
| WO | 2011066229 | 6/2011 |

\* cited by examiner

IRRIGATION DEVICE FOR PROMOTING DEEP ROOT GROWTH OF A PLANT

CROSS-REFERENCE TO RELATED APPLICATIONS

This application is a continuation-in-part of U.S. Non-Provisional patent application Ser. No. 14/318,480, filed on Jun. 27, 2014, titled "Irrigation Device and Method of Promoting Deep Root Growth of a Plant", by inventor Jeffrey Ciudaj, the contents of which are expressly incorporated herein by this reference as though set forth in its entirety and to which priority is claimed.

FIELD OF THE PRESENT DISCLOSURE

The present disclosure relates generally to a device for promoting the downward growth of the roots of a plant. More particularly, the present disclosure generally relates to a device that provides deep root watering of a plant and promotes the growth of the roots of a plant deeper into the ground. The device may be adapted to couple with an existing irrigation drip line system and may repel the roots of the plant away from the device, so that the strengthened roots are hindered from damaging the device.

BACKGROUND

For thousands of years, farmers and, more specifically, viticulturists have generally been irrigating plants and vines to provide for a controlled and consistent growth in the face of inconsistent weather patterns. More recently, farmers have also adopted a system of drip irrigation that generally allows each and every vine in a field to be individually watered efficiently without water wasting sprinklers. However, this drip irrigation system typically provides water only the top of the soil, which generally fails to penetrate deep into the soil. As a result, roots of the vines or plants remain near the surface of the soil, rather than burrowing deep down into the soil, as preferred for a healthy and hardy plant. When a vine or plant has deep roots, the plant is usually better able to find its own supply of water in the lower water table. This in turn allows the plant to survive harsh weather conditions, such as extreme cold, extreme heat, flooding, or drought.

In order to overcome the above limitations, a system utilizing deep root irrigation may be used. One device that provides for deep root irrigation is disclosed in U.S. Pat. No. 8,381,437 ("the '437 patent"), issued to Jeffrey Ciudaj, who is the same inventor of the present disclosure. The contents of the '437 patent are expressly incorporated herein by this reference as though set forth in their entirety. The '437 patent discloses a device and method for providing irrigation water to a plant that promotes the growth of the roots of the plant deep into the soil. The irrigation device disclosed in the '437 patent may also couple to an existing irrigation drip line system that previously provided water to the plant and may repel the roots of the plant away from the apparatus. This will preferably prevent the roots of the plant from intruding into the hose of the irrigation device and thus prevent damaging to the irrigation device.

Although the '437 patent is a vast improvement over standard irrigation systems, the present disclosure presents important and novel improvements to the '437 patent. For example, the '437 patent fails to disclose an irrigation system that would deter rodents and other pests seeking water from gnawing on the hoses of the irrigation system. The '437 patent also does not include additional features that would help simplify the measuring of the tubing when installing of the irrigation device into the ground. While the deep root irrigation system of the '437 patent helps repel roots of a plant from growing into the tube of the irrigation system, the deep root irrigation system does not prevent root growth towards the hose in its entirety. Thus, it would be beneficial to provide a new and improved irrigation device that promotes growth to a root to a plant while repelling the roots from growing towards any parts of the entire hose.

Thus, what is needed is a new and improved, efficient deep root irrigation system that can overcome the deficiencies set forth above.

SUMMARY

To minimize the limitations in the prior art, and to minimize other limitations that will become apparent upon reading and understanding the present specification, the following discloses a new and improved irrigation device for providing irrigation water to roots of a plant.

One embodiment may be an irrigation device comprising: a tube; and a hose; wherein the tube may comprise a copper coating; wherein at least a portion of the tube may extend into and may be substantially surrounded by the hose and wherein a distal end of the tube may be substantially confined within the hose; wherein the tube may pass through a first end of the hose and wherein the first end of the hose may be closed around the tube, such that the tube is kept substantially in place and such that water exiting from the distal end of the tube may be substantially prevented from exiting out of the first end of the hose; wherein a second end of the hose may be closed, such that the water exiting from the distal end of the tube is substantially prevented from exiting out of the second end of the hose; and wherein the hose may comprise a plurality of perforations that allow the water exiting from the distal end of the tube to seep out of the hose. The copper coating may be located approximately at the distal end of the tube and contained entirely within the hose.

Another embodiment may be an irrigation device comprising: a tube; and a hose; wherein the hose may comprise one or more copper elements; wherein the tube may lack the one or more copper elements; wherein at least a portion of the tube may extend into and may be substantially surrounded by the hose and wherein a distal end of the tube may be substantially confined within the hose; wherein the tube may pass through a first end of the hose and wherein the first end of the hose may be closed around the tube, such that the tube may be kept substantially in place and such that water exiting from the distal end of the tube may be substantially prevented from exiting out of the first end of the hose; wherein a second end of the hose may be closed, such that water exiting from the distal end of the tube is substantially prevented from exiting out of the second end of the hose; and wherein the hose may comprise a plurality of perforations that allow the water exiting from the distal end of the tube to seep out of the hose. The one or more copper elements may be a plurality of copper metal flecks. The plurality of copper metal flecks may be embedded within the hose. The plurality of copper metal flecks may be coupled to an interior surface of the hose. The plurality of copper metal flecks may be coupled to an exterior surface of the hose. The one or more copper elements may be one or more copper metal threads. The one or more copper metal threads may be embedded within the hose. The one or more copper metal threads may be coupled to an interior surface of the hose. The one or more copper metal threads may be coupled to an exterior surface of the hose.

Another embodiment may be an irrigation device comprising: a tube; wherein the tube may be adapted to emit an odor; wherein the odor may repel one or more animals from damaging the irrigation device. The odor may be at least one odor selected from the group of odors consisting of: a scent; a flavor; a taste; and a chemical.

Another embodiment may be an irrigation device comprising: a tube; and an odor device; wherein the odor device may be adapted to emit an odor that repels one or more animals from damaging the irrigation device. The odor may be at least one odor selected from the group of odors consisting of: a scent; a flavor; a taste; and a chemical.

Another embodiment may be an irrigation device comprising: a tube; and a hose; wherein the tube may be adapted to emit an odor; wherein the odor may repel one or more animals from damaging the irrigation device; wherein at least a portion of the tube may extend into and may be substantially surrounded by the hose and wherein a distal end of the tube may be substantially confined within the hose; wherein the tube may pass through a first end of the hose and wherein the first end of the hose may be closed around the tube, such that the tube may be kept substantially in place and such that water exiting from the distal end of the tube may be substantially prevented from exiting out of the first end of the hose; wherein a second end of the hose may be closed, such that water exiting from the distal end of the tube may be substantially prevented from exiting out of the second end of the hose; and wherein the hose may comprise a plurality of perforations that allow the water exiting from the distal end of the tube to seep out of the hose. The odor may be at least one odor selected from the group of odors consisting of: a scent; a flavor; a taste; and a chemical.

Another embodiment may be an irrigation device comprising: a tube; a hose; and an odor device; wherein the odor device may be adapted to emit an odor that repels one or more animals from damaging the irrigation device; wherein at least a portion of the tube may extend into and may be substantially surrounded by the hose and wherein a distal end of the tube may be substantially confined within the hose; wherein the tube may pass through a first end of the hose and wherein the first end of the hose may be closed around the tube, such that the tube may be kept substantially in place and such that water exiting from the distal end of the tube is substantially prevented from exiting out of the first end of the hose; wherein a second end of the hose may be closed, such that water exiting from the distal end of the tube is substantially prevented from exiting out of the second end of the hose; and wherein the hose may comprise a plurality of perforations that allow the water exiting from the distal end of the tube to seep out of the hose. The odor may be at least one odor selected from the group of odors consisting of: a scent; a flavor; a taste; and a chemical.

Another embodiment may be an irrigation device comprising: a tube; and a hose; wherein the hose may comprise one or more measurement marks; wherein at least a portion of the tube may extend into and may be substantially surrounded by the hose and wherein a distal end of the tube may be substantially confined within the hose; wherein the tube may pass through a first end of the hose and wherein the first end of the hose may be closed around the tube, such that the tube may be kept substantially in place and such that water exiting from the distal end of the tube may be substantially prevented from exiting out of the first end of the hose; wherein a second end of the hose may be closed, such that water from the water exiting from the distal end of the tube may be substantially prevented from exiting out of the second end of the hose; and wherein the hose may comprise a plurality of perforations that allow water from the water source to seep out of the hose. The one or more measurement marks may be disposed on the tube and positioned above the first end of the hose. The one or more measurement marks may be positioned above approximately between three to four inches above the first end of the hose.

It is an object to provide a methods and devices for encouraging the growth of plants roots in a downward direction deeper into the soil.

It is another object to incorporate an existing irrigation system with the watering apparatus device and/or enhanced watering method.

It is another object to provide an irrigation system that saves and preserves water.

It is another object to provide an irrigation system to help increase the efficiency of water distribution.

It is another object to provide an irrigation system that would deter rodents and other pests from gnawing on the hoses of the irrigation system.

It is another object to provide an irrigation system that would help simply the installation of the irrigation device when installing the device into the ground.

It is another object to provide an irrigation system that would prevent root growth towards the entire hose or portions thereof.

It is another object to provide an irrigation system that is organic compliant.

It is yet another object to overcome the limitations of the prior art.

BRIEF DESCRIPTION OF THE DRAWINGS

The drawings are of illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE ILLUSTRATIVE EMBODIMENTS

In the following detailed description, numerous specific details are set forth in order to provide a thorough understanding of various aspects of one or more embodiments. However, the one or more embodiments may be practiced without some or all of these specific details. In other instances, well-known methods, procedures, and/or components have not been described in detail so as not to unnecessarily obscure aspects of the embodiments.

Although several specific embodiments are disclosed, other embodiments of will become apparent to those skilled in the art from the following detailed description, which shows and describes only several illustrative embodiments. As will be realized, these embodiments are capable of modifications in various obvious aspects, all without departing from the spirit and scope of the present disclosure. Accordingly, these figures are to be regarded as merely illustrative in nature and not restrictive. Also, the reference or non-reference to a particular embodiment shall not be interpreted to limit the scope of the disclosure.

Figure 1:
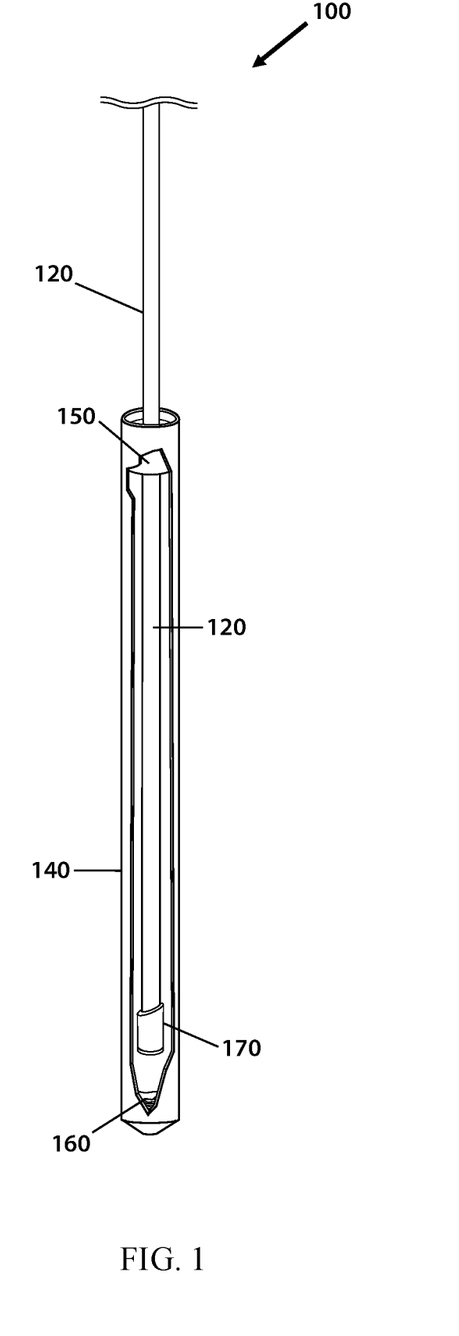
FIG. 1 is an illustration of a cutaway perspective view of one embodiment of the irrigation device.

FIG. 1 is an illustration of a cutaway perspective view of one embodiment of the irrigation device. As shown in FIG. 1, one embodiment of the irrigation device 100 may comprise: a tube 120, a hose 140, a first plug 150, and a second plug 160. The tube 120 may be adapted to couple to another tube of an existing irrigation drip line emitter via a coupler or connector in order to receive water from a water source. It is also contemplated that that the irrigation device 100 may be integrated or combined with any source of water or other nutrient providing system. Importantly, FIG. 1 also shows that the tube 120 may comprise a copper coating 170. The copper coating 170 may be applied to the tube by painting, powder coating, curing, and plating.

In one embodiment, the tube 120 (or irrigation drip line emitter tube) may be a ¼" irrigation line of various lengths. Additionally, the tube irrigation drip line emitter may be couple to—or otherwise be part of—an existing irrigation drip line emitter. The hose 140 may be a soaker hose, sheath, or shroud. The hose 140 may also be adjusted in various lengths.

When the irrigation system 100 is coupled to a source of water such as a drip line emitter, and when that source of water is activated, water may travel from the source of water and may pass through the second end or lower end of the tube 120, and fill inside the hose 140. In other various embodiments, the water may also pass through any valves, if needed, which may regulate the water flow. The valves, if any, may also prevent the back flow of water. The tube 120 may be constructed from an natural or man-made material, including, but not limited to High-Density Polyethylene ("HDPE"), Medium-Density Polyethylene ("MDPE"), copper, iron, or lead pipes, thermoplastic polymers like Polyvinyl chloride ("PVC"), Chlorinated polyvinyl chloride ("CPVC"), Acrylonitrile butadiene styrene ("ABS"), cross-linked polyethylene ("PEX plastic") pressure pipes, or any other similar material that can assist to resist mold, corrosion, and weather damage. If desired, a pressure control valve may also be installed to regulate water pressure and help prevent excessive pressure from harming the irrigation system.

The irrigation device 100 may be assembled and then placed in a hole in the ground adjacent to the plant or vine to be irrigated. The hole in the ground may be a deep and substantially vertical hole that can accommodate the length of the hose 140 and tube 120. The irrigation device 100 also may be buried deep enough, so that roots of the plant being irrigated will strive to get to the water provided by device 100.

In one embodiment, the copper coating 170 may be positioned at the second end or lower end of the tube 120 and may be near the lower end of the hose 140. In addition to repelling roots from growing towards and into tube 120, the copper coating 170 may also function as a catalyst in photosynthesis and respiration. By incorporating copper coating 170, the roots of a plant that the irrigation device 100 is watering may be deterred from growing towards the irrigation device 100 and choking the irrigation device 100. In a preferred embodiment, the copper coating 170, which may be located approximately at the bottom or second end of the tube 120, as shown in FIG. 1, may also substantially prevent the roots of the plant from damaging the hose 140 and tube 120, or from clogging the water supply exiting the lower end of the tube 120.

The hose 140 may be a soaker hose, sheath, shroud, liquid-permeable membrane, or other type of perforated hollow hose that comprises small holes or perforations, which may allow the water to seep out of the hose 140 as it travels up the length of the hose 140. Specifically, the water may pass through the tube 120, and/or tube of the irrigation drip line emitter and may begin to fill the hose 140. The water may then seep out of the hose 140 and into the ground surrounding the hose 140. The water generally first seeps out of the hose 140 at the deepest part of the hose 140. If the water exits the tube 120 at a sufficiently high flow rate, then the water, in addition to seeping out of the perforations of the hose 140 at the bottom, may travel upwards along the length of the hose and may form a column of water around the device 100. Generally, the hose 140 will have more water seeping out of the bottom and less water seeping out of the top when water is flowing.

The hose 140 may comprise a first plug 150, which is generally configured to couple the tube 120 to the hose 140 and may be used to plug, stop, or cap the first end or upper end of the hose 140 to prevent water from exiting out of the top of the hose 140 and gushing upwards. In the embodiment shown in FIG. 1, the first plug 150 may be a ribbed and/or cylindrical plug that allows the tube 120 to pass through the hose 140 and plug the hose 140. On the other hand, the second plug may be configured to stop or cap the lower end of the hose 140 to force water to exit out of the holes of the hose 140. Like the first plug 150, the second plug 160 may also be a ribbed and/or cylindrical plug that stops and plugs at the bottom end of the hose 140, as shown in FIG. 1. Alternatively, the hose 140 may simply be tied off, sealed, glued, crimped, or otherwise plugged, to prevent the water from exiting out the end of the hose 140. Although FIG. 1 shows that plugs may be used to close or seal the upper end and lower end of the hose 140, the irrigation device 100 may lack plugs and instead have the ends of the hose 140 sealed by any other means.

The water may first exit the hose 140 out of perforations, and depending upon how much water is provided to the irrigation device 100, more water may be provided through the holes or perforations that are above the hose 140. When the irrigation device 100 is first installed, more water may be provided, so that the roots of a plant sense the water and begin growing deeper immediately. A column of water saturating the soil may be created along the hose 140, which may allow the roots to grow downwards to and through the saturated soil and towards the hose 140. In a preferred embodiment, the saturated column of soil preferably never reaches the surface of the soil, thereby preventing loss of water to evaporation. Additionally, the copper coating 170 may be placed near the lowest position in the irrigation device 100.

When the irrigation device 100 is placed inside a hole in the ground, the hole may be back filled with an aerating composition, such as gravel or sand to provide additional aeration of the soil. The hole in the ground may also be backfilled with any composition, so long as the irrigation device 100 is held in substantially in place and may provide water to plant being irrigated.

When the irrigation device 100 is used, a moist column of soil may be created that is substantially deeper and more effective than what can be created by a standard drip irrigation system or sprinkler system. By creating deeper roots, the plant may be able to better survive harsh weather, such as extreme heat, cold, unseasonable weather, drought, flooding, or excessive rainfall. Plants without deep roots are much less likely to survive harsh weather.

Figure 2:
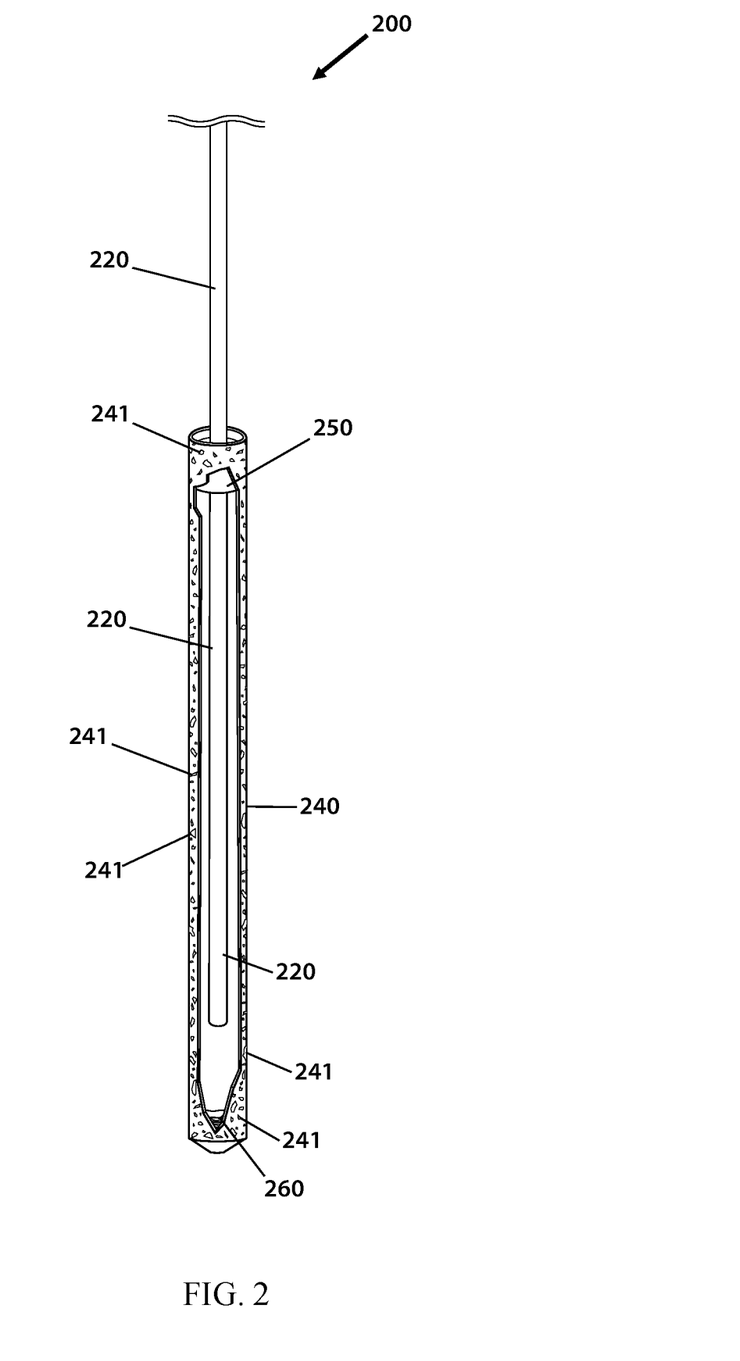
FIG. 2 is an illustration of a cutaway perspective view of another embodiment of the irrigation device.

FIG. 2 is an illustration of a cutaway perspective view of another embodiment of the irrigation device. As shown in FIG. 2, another embodiment of the irrigation device 200 may comprise: a tube 220, a hose 240, a first plug 250, and a second plug 260. The hose 240 may also comprise a plurality of copper elements 241. FIG. 2 shows that the copper elements 241 may be flecks of copper metal that are embedded within the hose 240. In other embodiments, the flecks may be coupled to the inside and/or outside of the hose 240. In one embodiment, the hose 240 may comprise the copper elements 241 and the tube 220 may lack the copper elements 241. FIG. 2 shows that the plurality of copper elements 241 may be scattered along the length of the hose 240. In other embodiments the copper elements 241 may be only present in one part of the hose 240, such as the bottom portion of the hose 240.

One end of the tube 220, which is generally the first end or upper end of the tube 220, may be coupled to an existing irrigation drip line emitter. The second end or lower end of the tube 220 is generally located inside the hose 240. In an embodiment, the tube 220 may also be a ¼" irrigation line of various lengths. It should be understood that the irrigation device may be combined with any source of water or other nutrient providing system. The hose 240 may have a first plug 250, which is generally adapted to connect the tube 220 to the hose 240 and may be used to stop or cap the upper end of the hose 240 to force water to exit out of the perforations of the hose 240. In the embodiment shown in FIG. 2, the first plug 250 may be a rubber plug and may be glued to hold the first plug 250 to the hose 240. Additionally, the first plug 250 may allow the tube 220 to pass through and may allow the first plug 250 to snugly fit tight inside the hose 240. Additionally, the second plug 260 may be configured to stop or cap the lower end of the hose 240 to force water to exit out of the perforations. Like the first plug 250, the second plug 260 may plug the second or bottom end of the hose 240 as a hot melted glue plug formed in an aluminum cap mold.

The copper elements 241 may be configured to repel roots from growing into hose 240 and/or tube 220, the copper elements 241 may also function as catalysts in photosynthesis and respiration. By incorporating the plurality of copper elements 241 into the hose 240, the roots of a plant that the irrigation device 200 is watering may be prevented from growing out of control and choking the irrigation device 200. In a preferred embodiment, the copper elements 241, which may be located approximately at the bottom or second end of the hose 240 may also substantially prevent the roots of the plant from damaging the hose 240 and tube 220, or from clogging the water supply exiting the tube 220.

The hose 240 may be a soaker hose, sheath, shroud, liquid-permeable membrane, or other type of perforated hollow hose that has small holes or perforations, which may allow the water to seep out of the hose 240 as it travels up the length of the hose 240. The embodiment shown in FIG. 2 also shows that the hose 240 may be impregnated with copper metal flecks, bits, or pieces.

Figure 3:
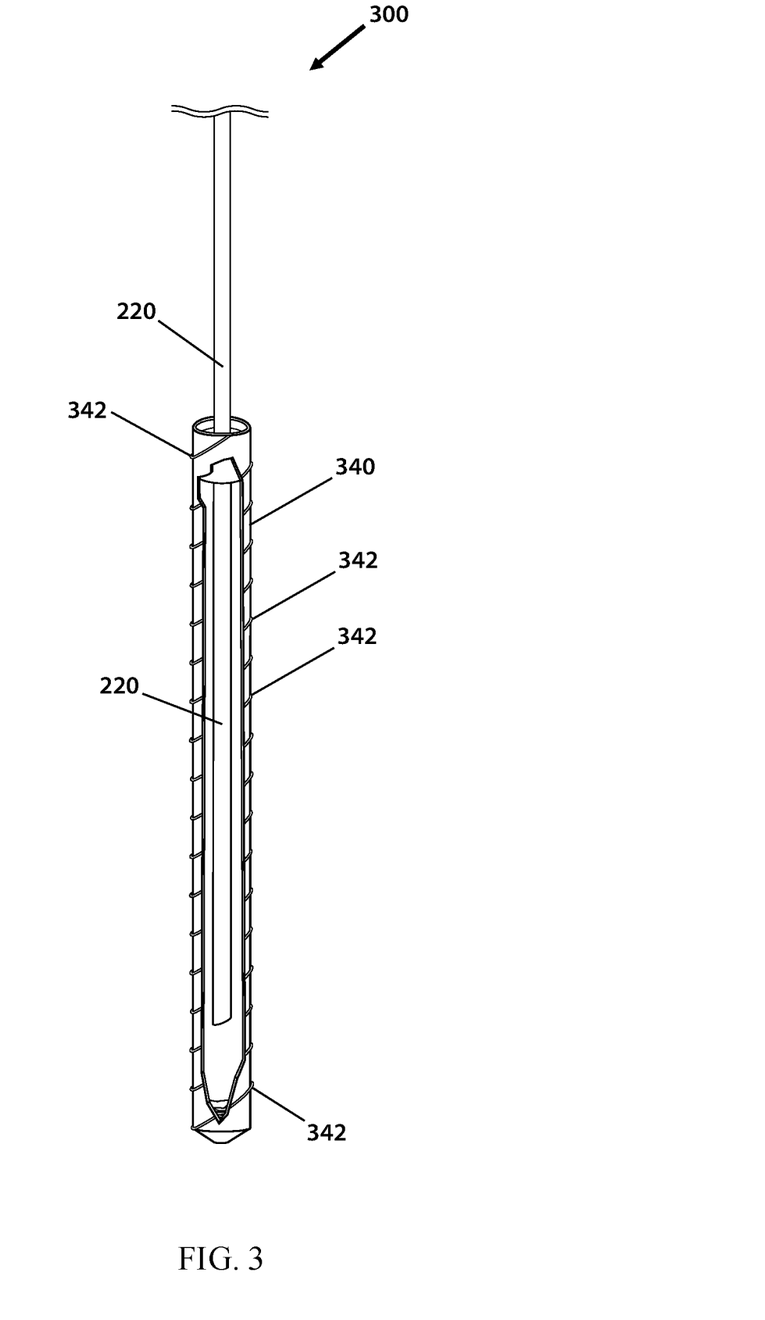
FIG. 3 is an illustration a cutaway perspective view of another embodiment of the irrigation device.

FIG. 3 is an illustration a cutaway perspective view of another embodiment of the irrigation device. As shown in FIG. 3, another embodiment of the irrigation device 300 may comprise: a tube 220 and a hose 340. The hose 340 may comprise one or more copper elements 342. FIG. 3 shows that the copper elements 342 may be one or more copper metal wires, strands, or threads that are embedded within the hose 340. In other embodiments, the one or more threads may be wound and coupled to the inside and/or outside of the hose 340. FIG. 3 shows that the copper elements 342 may be present along the entire length of the hose 340. In other embodiments the copper elements 342 may be only present in one part of the hose 340, such as the bottom portion of the hose 340.

The copper elements 342 may generally repel roots from growing into hose 340 and/or tube 220, the copper elements 342 may also function as catalysts in photosynthesis and respiration. By incorporating the copper elements 342 into the hose 340, the roots of a plant that the irrigation device 300 is watering may be prevented from growing out of control and choking the irrigation device 300. In a preferred embodiment, the copper elements 342 may also substantially prevent the roots of the plant from damaging the hose 340 and tube 220, or from clogging the water supply exiting the tube 220.

The hose 340 may be a soaker hose, sheath, shroud, liquid-permeable membrane, or other type of perforated hollow hose that has small holes or perforations, which may allow the water to seep out of the hose 340 as it travels up the length of the hose 340. The embodiment shown in FIG. 3 may also be impregnated with copper metal flecks, bits, or pieces.

Figure 4:
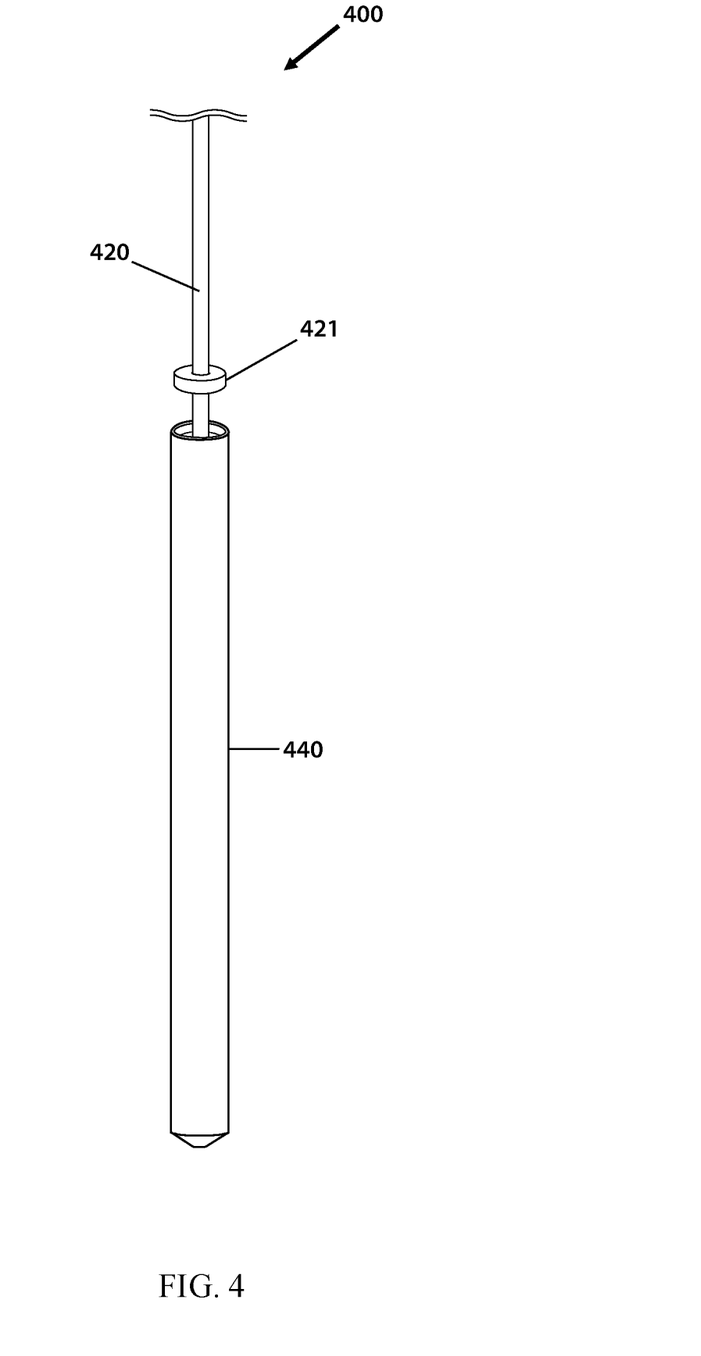
FIG. 4 is an illustration of perspective view of another embodiment of the irrigation device and shows an odor device.

FIG. 4 is an illustration of perspective view of another embodiment of the irrigation device and shows an odor device. As shown in FIG. 4, another embodiment of the irrigation device 400 may comprise: a tube 420, a hose 440, and an odor device 421. The odor device 421 shown in FIG. 4 may be coupled to the tube 420 at a point above the hose 440. In another embodiment, rather than having an odor device, the irrigation device may comprise a tube and/or hose that is impregnated with an odor, flavor, chemical, or taste. Preferably, the purpose of the odor and/or odor device 421 is to prevent animals and vermin, such as rats, rabbits, birds, ground squirrels, raccoons, coyotes from chewing on and thereby damaging the irrigation device 400 and accessing the water that flows within the tube 420 and/or hose 440. The odors, flavors, and or tastes used in association with the irrigation device 400 to repel pests may be at least one of the following natural or synthetic odors, flavors, tastes, and/or chemicals: coyote urine; urine; predator urine (e.g., mountain lion); skunk secretion, mint; predator dander/hair; herbs; pepper; capsaicin; and various types of chemical based repellants. In some embodiments, the odor, flavor, taste, or chemicals may be part of the mixture composition of the tube or hose themselves. In other embodiments, they may be added to the tube or hose after production. For instance, the odor may be added to plastic pellets which are melted and used to make extrusions of irrigation tubing.

In one embodiment, the odor may be a flavor added to the tube 420 to prevent animals from biting onto the tube 420 and will preferably have no effect on the water quality. Thus, the tube 420 may be scented and flavored to the specific dislike of the animals.

In other embodiments, the irrigation device may comprise an odor device 421 which may be removeably or permanently coupled to the tube 420 or hose 440. As shown in FIG. 4, the odor device 421, which may be filled or impregnated with the odor, flavor, taste, and/or chemical, may be a device that surrounds and/or attaches to the tube 420.

Figure 5:
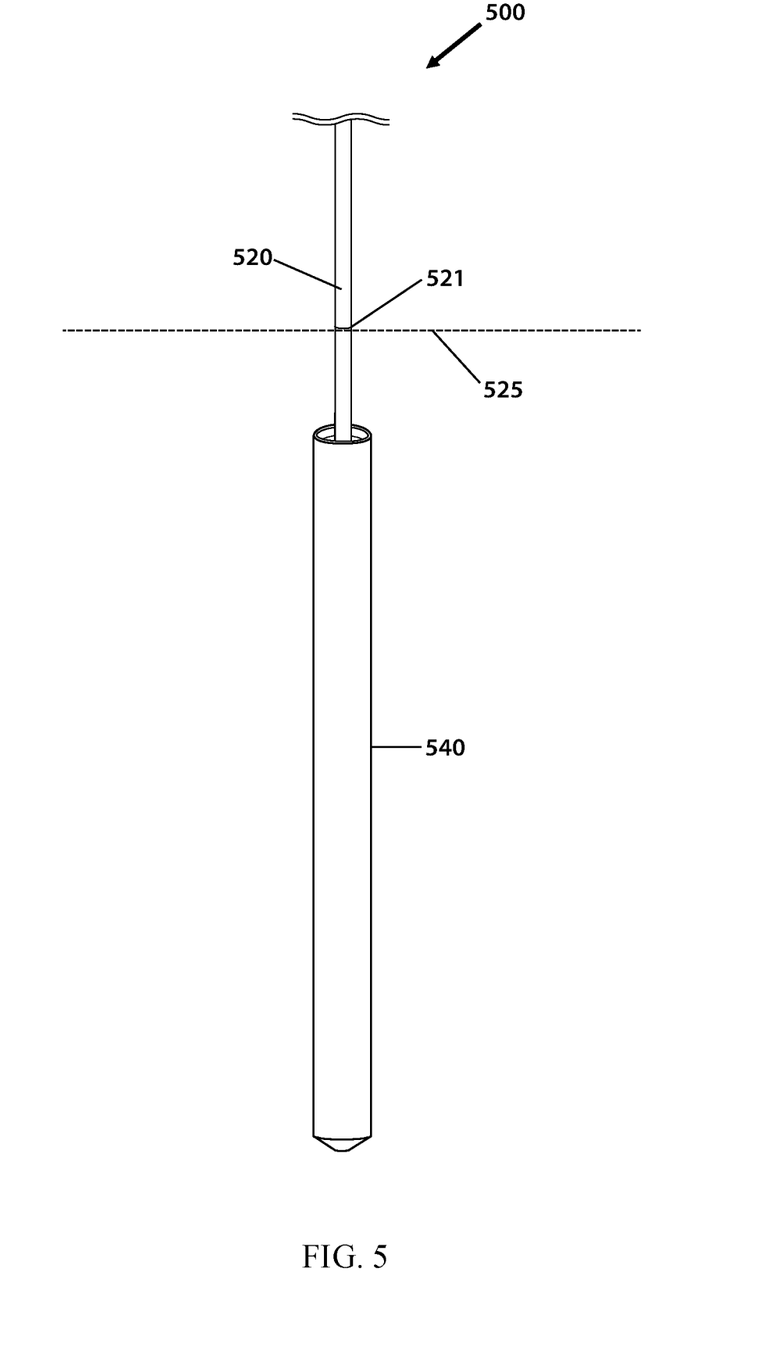
FIG. 5 is an illustration of a perspective view of another embodiment of the irrigation device with measurement markings.

FIG. 5 is an illustration of a perspective view of another embodiment of the irrigation device with measurement markings. As shown in FIG. 5, another embodiment of the irrigation device 500 may comprise: a tube 520, a hose 540, and a measurement mark 521. FIG. 5 shows that the measurement mark 521 may be positioned on the tube 520 and at a point above the hose 540. Preferably, the purpose of the measurement mark 521 is to identify the depth of the irrigation device when installed into the ground and may be used to assist the user by providing an indication as to how deep the irrigation device 500 is at below the ground 525. For instance, in one embodiment, the measurement mark 521 may be located on the tube 520 approximately between three to four inches above the hose 540. In a preferred embodiment, the measurement mark 521 may be located on the tube 520 at an area approximately 3½ inches above the hose 540. Once the irrigation device 500 is fed into the ground, the measurement mark may just be visible above the ground 525. The measurement mark 521 may be a marking such as a colored stripe (e.g., white line), tape, or other identifying means. Although FIG. 5 only shows a single measurement mark 521, several measurement marks may be used to indicate various depth levels. For example, one embodiment of the irrigation device 500 may utilize several measurement marks to show multiple increments in inches (e.g., three inches, four inches, five inches, etc. . . . ).

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

The foregoing description has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of the present disclosure. Accordingly, the detailed description is to be regarded as illustrative in nature and not restrictive. Also, although not explicitly recited, the one or more embodiments may be practiced in combination or conjunction with one another. Furthermore, the reference or non-reference to a particular embodiment shall not be interpreted to limit the scope of the disclosure. It is intended that the scope of the disclosure not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

What is claimed is:

1. An irrigation device, comprising:
a tube; and
a hose;
wherein said hose comprises one or more copper elements;
wherein said tube lacks said one or more copper elements;
wherein at least a portion of said tube extends into and is substantially surrounded by said hose and where a distal end of said tube is substantially confined within said hose;
wherein said tube passes through a first end of said hose and wherein said first end of said hose is closed around said tube, such that said tube is kept substantially in place and such that water exiting from said distal end of said tube is substantially prevented from exiting out of said first end of said hose;
wherein a second end of said hose is closed, such that water exiting from said distal end of said tube is substantially prevented from exiting out of said second end of said hose;
wherein said hose comprises a plurality of perforations that allow said water exiting from said distal end of said tube to seep out of said hose;
wherein said one or more copper elements are a plurality of copper metal flecks; and
wherein said plurality of copper metal flecks is embedded within said hose.

2. An irrigation device, comprising:
a tube; and
a hose;
wherein said hose comprises one or more copper elements;
wherein said tube lacks said one or more copper elements;
wherein at least a portion of said tube extends into and is substantially surrounded by said hose and where a distal end of said tube is substantially confined within said hose;
wherein said tube passes through a first end of said hose and wherein said first end of said hose is closed around said tube, such that said tube is kept substantially in place and such that water exiting from said distal end of said tube is substantially prevented from exiting out of said first end of said hose;
wherein a second end of said hose is closed, such that water exiting from said distal end of said tube is substantially prevented from exiting out of said second end of said hose;
wherein said hose comprises a plurality of perforations that allow said water exiting from said distal end of said tube to seep out of said hose; and
wherein said one or more copper elements are one or more copper threads.

3. The irrigation device of claim 2, wherein said one or more copper metal threads are embedded within said hose.

4. The irrigation device of claim 2, wherein said one or more copper metal threads are coupled to an interior surface of said hose.

5. The irrigation device of claim 2, wherein said one or more copper metal threads are coupled to an exterior surface of said hose.

* * * * *